United States Patent
Bolz et al.

(10) Patent No.: US 6,510,685 B2
(45) Date of Patent: Jan. 28, 2003

(54) METHOD FOR CONTROLLING CATALYTIC CONVERTER HEAT LOSSES DURING COASTING SHUTOFF

(75) Inventors: Martin-Peter Bolz, Buehl (DE); Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/754,077

(22) Filed: Jan. 5, 2001

(65) Prior Publication Data

US 2001/0005987 A1 Jul. 5, 2001

(30) Foreign Application Priority Data

Jan. 5, 2000 (EP) .............................. 00100056

(51) Int. Cl.[7] .................................. F01N 3/00
(52) U.S. Cl. .................... 60/285; 60/274; 123/90.15; 123/481
(58) Field of Search .................... 60/274, 284, 285, 60/277, 293, 300; 123/90.15, 90.16, 90.17, 90.18, 198 DB, 320, 325, 481, 676, 65 PE; 180/65.2

(56) References Cited

U.S. PATENT DOCUMENTS

| | | | |
|---|---|---|---|
| 3,662,541 A | * 5/1972 | Sawada et al. | 60/293 |
| 4,128,998 A | * 12/1978 | Hattori et al. | 60/277 |
| 4,621,600 A | * 11/1986 | Hasegawa | 123/198 DB |
| 5,060,611 A | * 10/1991 | Krampe et al. | 123/320 |
| 5,398,502 A | 3/1995 | Watanabe | |
| 5,483,941 A | * 1/1996 | Cullen et al. | 123/481 |
| 5,490,381 A | * 2/1996 | Becker | 60/285 |
| 5,531,203 A | * 7/1996 | Komatsuda et al. | 123/481 |
| 5,575,246 A | * 11/1996 | Ito | 123/65 PE |
| 5,586,432 A | * 12/1996 | Huemer et al. | 60/285 |
| 5,722,236 A | * 3/1998 | Cullen et al. | 60/274 |
| 5,931,124 A | 8/1999 | Kerkau et al. | |
| 6,059,057 A | * 5/2000 | Yamazaki et al. | 180/65.2 |
| 6,138,784 A | * 10/2000 | Oshima et al. | 180/65.2 |
| 6,209,313 B1 | * 4/2001 | Wissler et al. | 60/274 |
| 6,389,807 B1 | * 5/2002 | Suzuki et al. | 60/277 |

FOREIGN PATENT DOCUMENTS

| | | |
|---|---|---|
| DE | 195 01 386 | 8/1996 |
| EP | 0193622 | 9/1986 |
| EP | 0826870 | 3/1998 |
| GB | 2277126 | 10/1994 |

\* cited by examiner

*Primary Examiner*—Thomas Denion
*Assistant Examiner*—Tu M. Nguyen
(74) *Attorney, Agent, or Firm*—Walter Ottesen

(57) ABSTRACT

The invention is directed to a method of controlling catalytic converter heat losses during coasting shutoff in an internal combustion engine which includes a valve and a valve positioner having an adjustable stroke set point, and a catalytic converter. In the method, the stroke set point is fixed as a function of a temperature of the catalytic converter.

10 Claims, 2 Drawing Sheets

METHOD FOR CONTROLLING CATALYTIC CONVERTER HEAT LOSSES DURING COASTING SHUTOFF

FIELD OF THE INVENTION

The invention relates to a method for controlling catalytic converter heat losses during coasting shutoff in an internal combustion engine having fully variable valve control.

BACKGROUND OF THE INVENTION

Coasting shutoff is a known procedure used in some automobiles whereby, when an automobile is coasting (that is, rolling from its own momentum with the gas pedal not depressed), fuel is no longer injected into the engine. Thus, although the engine continues to turn and the pistons continue to pump, no fuel is injected or burned by the engine.

Because the engine is still turning during coasting shutoff, fresh air is drawn into the engine cylinders by the pumping of the pistons and pushed out again through the exhaust system. Thus, the pumping function of the engine causes fresh air to be passed continuously through the catalytic converter. This causes the catalytic converter to cool off, thus diminishing its effectiveness.

In conventional throttle-controlled spark ignition engines, the undesired catalytic converter cooling effects can be minimized by closing the throttle valve during coasting shutoff, and thereby preventing fresh air from being drawn into the engine.

However, engines equipped with fully variable valve stroke control typically do not include a throttle. Instead, the valve stroke of the Intake valves is adjusted continuously from zero stroke (no intake) to the maximum possible stroke using suitable valve positioners, for example, hydraulic actuators, electromagnetic actuators, or mechanical variable valve actuators, such as an adjustable cam shaft. Therefore, it is not possible to control catalytic converter heat losses during coasting shutoff by closing the throttle valve.

SUMMARY OF THE INVENTION

The invention relates to a method for controlling catalytic converter heat losses during coasting shutoff for an internal combustion engine having a valve, a valve positioner having an adjustable stroke set point, and a catalytic converter characterized in that the stroke set point is fixed as a function of a temperature of the catalytic converter.

In an exemplary embodiment of the invention, the stroke set point is fixed equal to or less than a first predetermined set point value when the temperature of the catalytic converter is less than a first predetermined temperature. In another exemplary embodiment, the stroke set point is fixed equal to or greater than a second predetermined set point value when the temperature of the catalytic converter is greater than a second predetermined temperature. An embodiment of the invention may, for example, fix the stroke set point to the first predetermined set point value when the temperature of the catalytic converter is less than a first predetermined temperature and fix the stroke set point to a second predetermined stroke set point value when the temperature of the catalytic converter is greater than a second predetermined temperature. The first predetermined set point value may, for example, be zero, corresponding to a closed valve. The second predetermined set point value may, for example, correspond to a full valve stroke.

The first predetermined temperature may be determined as a function of a minimum converter operating temperature. The second predetermined temperature may be determined as a function of a maximum permissible converter operating temperature. In order to prevent rapid switching of the stroke set points between the two predetermined stroke set point values, the second predetermined temperature is greater than the first predetermined temperature. The temperature of the catalytic converter can be calculated, for example, using a catalytic converter temperature model. The invention may function by fixing the stroke set point value of an inlet valve, but could also function by fixing the valve stroke set point value of an exhaust valve of the internal combustion engine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
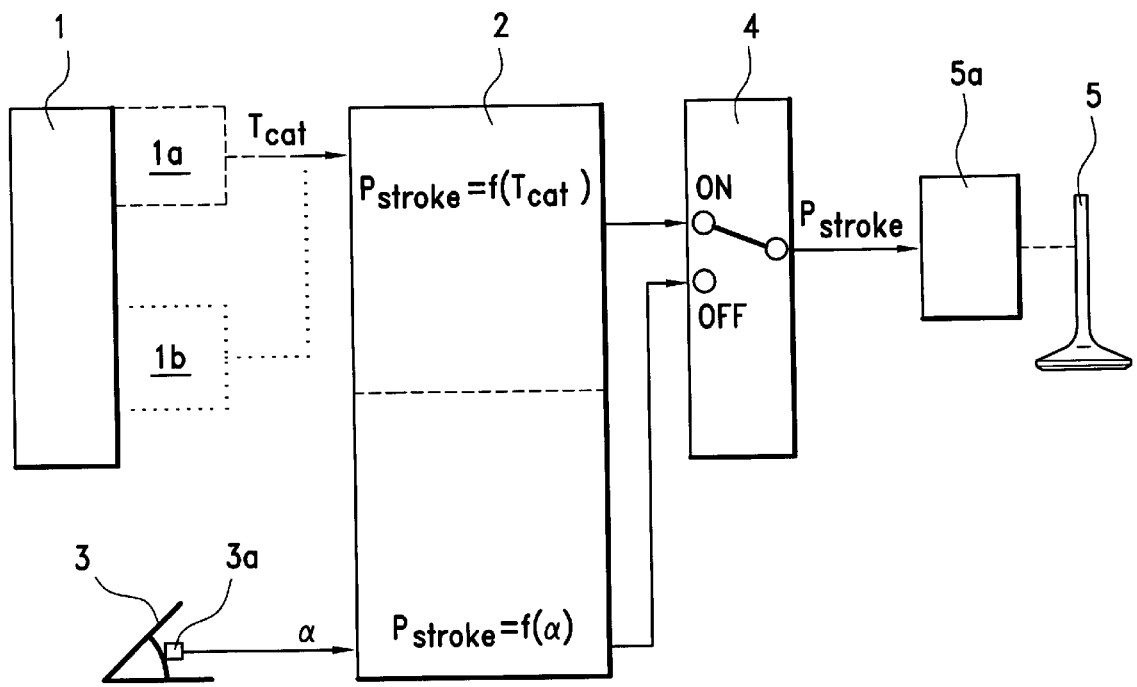
FIG. 1 is a block diagram illustrating components of an exemplary embodiment and their functions.

FIG. 1 shows a catalytic converter 1, coupled to a temperature sensor 1a for measuring its temperature, which, in turn, is coupled to a valve stroke control unit 2 which includes a microprocessor. In addition, a gas pedal 3 is coupled to a gas pedal position sensor 3a for measuring its position or angle, which, in turn, is coupled to the valve stroke control knit 2. The valve stroke control unit 2 is coupled to a valve stroke positioner 5a with a coasting shutoff switch 4 interposed therebetween. A valve stroke positioner is a known product used for example, in the BMW VVT system, the Delphi VVA system and the Meta VVL system.

As illustrated in FIG. 1, a valve stroke control unit 2 controls the valve 5 by sending a signal indicative of a valve stroke set point $P_{stroke}$ to the valve stroke positioner 5a. The valve stroke positioner 5a, in turn, actuates the valve 5 so that its maximum stroke corresponds to the current valve stroke set point $P_{stroke}$. During normal operation, that is, when coasting shutoff is not in operation, the coasting shutoff switch 4 is switched to the off position. In that mode, the valve stroke control unit 2 calculates the stroke set point $P_{stroke}$ based on a signal it receives from the gas pedal position sensor 3a. The gas pedal position sensor 3a continuously measures the position (or angle) of gas pedal 3 and sends a signal a indicative of that position (or angle). As will be described in more detail below, the valve stroke control unit 2 continuously calculates the valve stroke set point $P_{stroke}$ and sends a signal to the valve positioner 5a indicative of the valve stroke set point $P_{stroke}$ The valve stroke positioner 5a actuates the valve so that its maximum stroke corresponds to the current valve stroke set point $P_{stroke}$.

During coasting shutoff, that is, when the coasting shutoff switch 4 is switched to the on position, the valve stroke set point $P_{stroke}$ is no longer calculated as a function of the gas pedal position or angle α. Instead, the valve stroke set point $P_{stroke}$ is fixed to one of two predetermined valve stroke set point values based upon a catalytic converter temperature $T_{cat}$. The valve stroke control unit 2 receives an input signal indicative of the temperature $T_{cat}$ of a catalytic converter from a temperature sensor 1a located on or in the catalytic converter 1. Alternatively, the control unit 2 could calculate a value for the catalytic converter temperature $T_{cat}$ according to a catalytic converter temperature model 1b. Using the temperature model, $T_{cat}$ is calculated based upon measurable inputs such as engine temperature, engine speed, engine load, ignition angle and manifold air temperature. The routine used by the valve stroke control unit 2, to fix the valve stroke set point $P_{stroke}$ is shown in more detail in FIG. 2.

Figure 2:
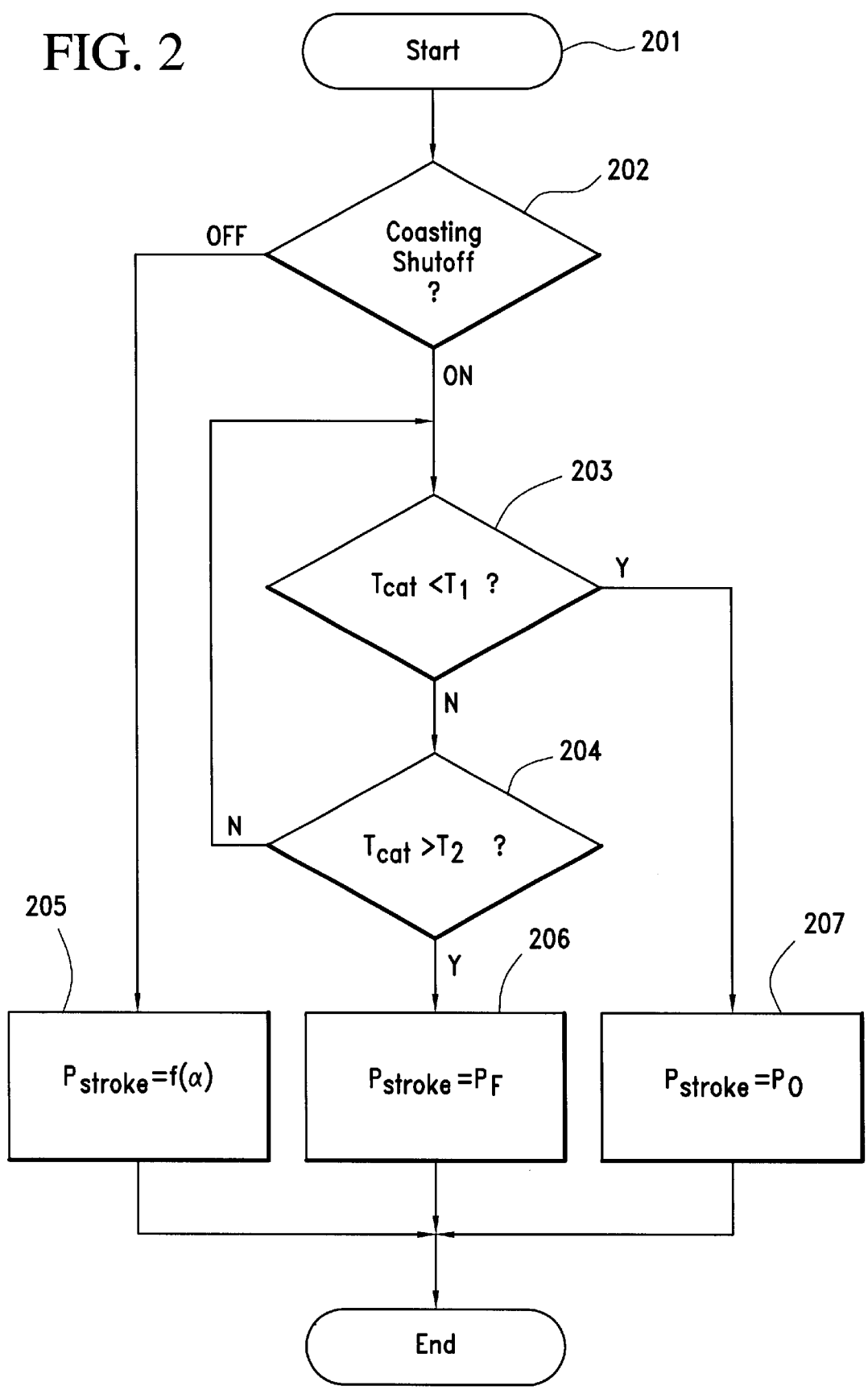
FIG. 2 is a flowchart illustrating a routine performed by the valve stroke control unit of FIG. 1; and, FIG. 3 is a diagram illustrating the relationship between the valve stroke set points and the temperature of the catalytic converter.

As shown in FIG. 2, the routine starts with step 201 after which the control unit 2 determines whether coasting shutoff is switched on in step 202. If coasting shutoff is not switched on, then the valve stroke set point $P_{stroke}$ is determined according to known methods in step 205, for example, as a function of the gas pedal position or angle α. If coasting shutoff is switched on, the temperature $T_{cat}$ of the catalytic converter is compared to a first predetermined temperature $T_1$ in step 203. If the temperature $T_{cat}$ of the catalytic converter is less than the first predetermined temperature $T_1$, the valve stroke set point $P_{stroke}$ is set equal to a first predetermined set point value $P_0$ in step 207. If, however, the temperature $T_{cat}$ of the catalytic converter is not less than a first predetermined temperature $T_1$, then the temperature $T_{cat}$ of the catalytic converter is compared to a second predetermined temperature $T_2$ in step 204. If the temperature $T_{cat}$ of the catalytic converter is greater than the second predetermined temperature $T_2$, the valve stroke set point $P_{stroke}$ is jet equal to a second predetermined set point value $P_F$ in step 206. If the temperature $T_{cat}$ of the catalytic converter is not greater than the second predetermined temperature $T_2$ (for example, somewhere between $T_1$ and $T_2$), then step 203 is repeated until the temperature is either less than the first $T_1$ or greater than the second predetermined temperature $T_2$. While these steps are being repeated, the valve can, for example, remain in the state it was last set in before coasting shutoff was switched on. After the stroke set point is fixed in steps 205, 206 or 207, the routine begins again at step 201.

The first predetermined temperature $T_1$ corresponds to a temperature indicative of the minimum effective operating temperature of the catalytic converter, while the second predetermined temperature $T_2$ corresponds to a temperature indicative of the maximum permissible operating temperature of the catalytic converter, and is in any case greater than $T_1$. The first predetermined set point value $P_0$ is equal to zero or approximately zero (corresponding to an approximately fully closed valve) in order to prevent air from circulating through the engine and the catalytic converter. The second predetermined set point value $P_F$ is equal to a value corresponding to a fully opened or nearly fully opened valve in order to allow for fresh air to circulate through the engine and the catalytic converter.

Thus, when the catalytic converter is below its minimum effective operating temperature, the valve is fixed in an approximately fully closed position during coasting shutoff. This prevents fresh air from being pumped through the engine which would otherwise further cool the catalytic converter. However, when the temperature $T_{cat}$ of the catalytic converter is at or near its maximum permissible operating temperature, heat losses are desirable in-order to cool the converter. To accomplish this, the valve is fixed in an approximately fully open position so that the resulting pumping action of the engine brings about the fastest possible cooling of the catalytic converter with fresh air during coasting shutoff. Once the catalytic converter temperature has decreased in this fashion, the stroke set point value is changed back to zero as soon as the converter temperature falls below the minimum effective operating temperature if coasting shutoff is still active.

Figure 3:
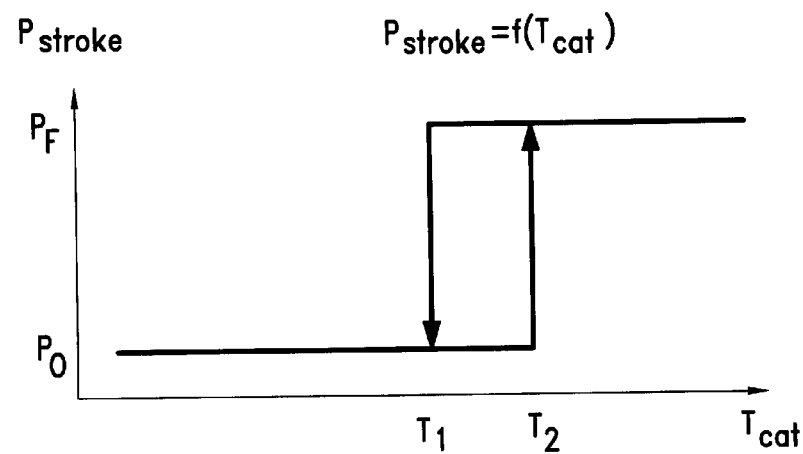

The switchover from the first predetermined stroke set point value $P_0$ (corresponding to an approximately fully closed valve) to the second predetermined stroke set point value ($P_F$) (corresponding to an approximately fully opened valve) according to the temperature $T_{cat}$ of the catalytic converter is shown in FIG. 3. As illustrated, the second predetermined temperature $T_2$ corresponds to the point at which the stroke set point $P_{stroke}$ switches from $P_0$ to $P_F$ and the first predetermined temperature $T_1$ corresponds to the point at which the stroke set point $P_{stroke}$ switches from $P_F$ to $P_0$. Because $T_2$ is greater than $T_1$, there is a hysteresis is effect, preventing rapid switchover transients due to measurement noise or the like.

The temperature $T_{cat}$ of the catalytic converter may be determined via a suitable temperature sensor located in or on the catalytic converter, but may also be calculated using a catalytic converter temperature model coexecuting in the computer. The temperature model calculates the temperature $T_{cat}$ of the catalytic converter based on engine temperature engine speed, engine load, ignition angle, and manifold air temperature.

If the engine also possesses an appropriate exhaust valve control system in addition to the intake valve control system, the stroke set point values to be defined as described above can alternatively refer to the exhaust valves.

It is understood that the foregoing description is that of the preferred embodiments of the invention and that various changes and modifications may be made thereto without departing from the spirit and scope of the invention as defined in the appended claims.

What is claimed is:

1. A method of controlling catalytic converter heat losses during coasting shutoff in an internal combustion engine not having a throttle flap, the engine including a valve and a valve positioner having an adjustable stroke set point ($P_{stroke}$) and a catalytic converter, the method comprising the step of fixing the stroke set point ($P_{stroke}$) as a function of a temperature ($T_{cat}$) of the catalytic converter only during said coasting shutoff of said engine;

wherein the valve being an inlet valve and the valve positioner being an inlet valve positioner.

2. The method of claim 1, wherein said stroke set point ($P_{stroke}$) is fixed equal to a first predetermined set point value ($P_0$) when the temperature of the catalytic converter is less than a first predetermined temperature ($T_1$).

3. The method of claim 1, wherein the temperature ($T_{cat}$) of the catalytic converter is calculated according to a catalytic converter temperature model.

4. The method of claim 2, wherein the stroke set point ($P_{stroke}$) is fixed equal to a second predetermined set point value ($P_F$) when the temperature ($T_{cat}$) of the catalytic converter is greater than a second predetermined temperature ($T_2$).

5. The method of claim 4, wherein the first predetermined temperature ($T_1$) is determined as a function of a minimum converter operating temperature, and the second predetermined temperature ($T_2$) is determined as a function of a maximum permissible operating temperature ($T_{max}$).

6. A method of controlling catalytic converter heat losses during coasting shutoff in an internal combustion engine which includes a valve and a valve positioner having an adjustable stroke set point ($P_{stroke}$) and a catalytic converter, the method comprising the steps of:

fixing the stroke set point ($P_{stroke}$) equal to a first predetermined stroke set point value ($P_0$) when the temperature ($T_{cat}$) of the catalytic converter is less than a first predetermined temperature ($T_1$); and fixing the stroke set point ($P_{stroke}$) equal to a second predetermined set point value ($P_F$) greater than said first predetermined stroke set point value ($P_0$) when the temperature ($T_{cat}$) of the catalytic converter is greater than a second predetermined temperature ($T_2$), the second predetermined temperature ($T_2$) being greater than or equal to the first predetermined temperature;

wherein the valve being an inlet valve and the valve positioner being an inlet valve positioner.

7. The method of claim 6, wherein: the stroke set point ($P_{stroke}$) is fixed equal to a second predetermined set point value ($P_F$) when the temperature ($T_{cat}$) of the catalytic converter is greater than a second predetermined temperature ($T_2$), the second predetermined temperature ($T_2$) being greater than or equal to the first predetermined temperature; and, the first predetermined set point value ($P_0$) corresponds to a closed or nearly closed valve and the second predetermined set point value ($P_F$) corresponds to a full or nearly full valve stroke.

8. The method of claim 6, wherein the first predetermined temperature ($T_1$) is determined as a function of a minimum converter operating temperature, and the second predetermined temperature ($T_2$) is determined as a function of a maximum permissible operating temperature ($T_{max}$).

9. The method of claim 6, wherein the temperature ($T_{cat}$) of the catalytic converter is calculated according to a catalytic converter temperature model.

10. A method of controlling catalytic converter heat losses during coasting shutoff in an internal combustion engine which includes a valve and a valve positioner having an adjustable stroke set point ($P_{stroke}$) and a catalytic converter, the method comprising the steps of:

fixing the stroke set point ($P_{stroke}$) equal to a first predetermined stroke set point value ($P_0$) when the temperature ($T_{cat}$) of the catalytic converter is less than a first predetermined temperature ($T_1$); and fixing the stroke set point ($P_{stroke}$) equal to a second predetermined set point value ($P_F$) greater than said first predetermined stroke set point value ($P_0$) when the temperature ($T_{cat}$) of the catalytic converter is greater than a second predetermined temperature ($T_2$), the second predetermined temperature ($T_2$) being greater than or equal to the first predetermined temperature;

wherein the valve being an outlet valve of a combustion chamber of said internal combustion engine and the valve positioner being an outlet valve positioner.

* * * * *